US009638543B2

(12) United States Patent
Nelson, Jr.

(10) Patent No.: US 9,638,543 B2
(45) Date of Patent: May 2, 2017

(54) RATE-OF-TURN BIAS ESTIMATION FOR MARINE NAVIGATION

(71) Applicant: Raven Industries, Inc., Sioux Falls, SD (US)

(72) Inventor: Robert Leonard Nelson, Jr., Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 1055 days.

(21) Appl. No.: 13/795,189

(22) Filed: Mar. 12, 2013

(65) Prior Publication Data

US 2014/0129171 A1 May 8, 2014

Related U.S. Application Data

(60) Provisional application No. 61/713,753, filed on Oct. 15, 2012.

(51) Int. Cl.
*G01C 25/00* (2006.01)
*G01C 19/5776* (2012.01)

(52) U.S. Cl.
CPC ....... *G01C 25/005* (2013.01); *G01C 19/5776* (2013.01)

(58) Field of Classification Search
CPC .................................................. G01C 25/005
See application file for complete search history.

(56) References Cited

U.S. PATENT DOCUMENTS

2009/0292495 A1* 11/2009 Navarro, Jr. ........... G01C 19/42 702/92

* cited by examiner

*Primary Examiner* — Manuel Rivera Vargas
(74) *Attorney, Agent, or Firm* — Schwegman Lundberg & Woessner, P.A.

(57) ABSTRACT

An example includes a method to estimate a bias affecting an inertial sensor. The method can include monitoring a plurality of rate-of-turn samples, from the inertial sensor, in a sequence over time, wherein each of the plurality of rate-of-turn samples includes substantially the same actual bias value that is included in each of the plurality of other rate-of-turn samples. The method can include estimating the bias as a weighted average of the plurality of rate-of-turn samples. The method can include determining an adjusted rate-of-turn sample by subtracting the bias from an instant rate-of-turn sample of the plurality of rate-of-turn samples. The method can include putting out the adjusted rate-of-turn.

22 Claims, 11 Drawing Sheets

100
102 BIASED RATE OF TURN
104 Σ + -
112 DISPLAYED RATE OF TURN
114 SENSOR
106
108
110

RATE-OF-TURN BIAS ESTIMATION FOR MARINE NAVIGATION

BACKGROUND

Some rate-of-turn (ROT) sensors, such as those for marine vessels, benefit from a degree of sensitivity that lies between the state of the art for relatively inexpensive microelectromechanical systems (MEMS) and the state of the art for relatively expensive fiber-optic gyroscopes (FOGs), e.g. about 1 degree per minute. A weakness of a MEMS device can be a difficulty in calibrating a long-term average error, which can be referred to as "bias." Additionally, it can be difficult to maintain that calibration, such as over the temperature range experienced on a ship's bridge.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
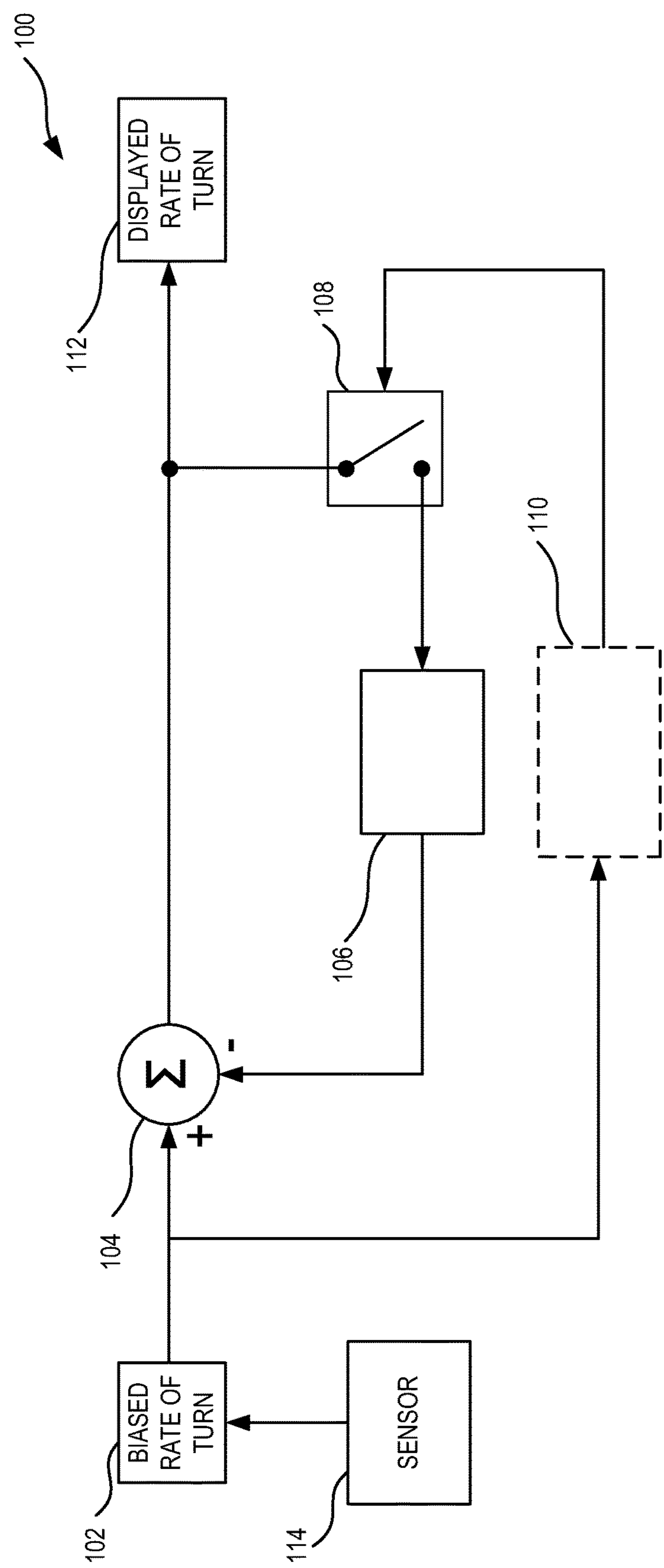
FIG. 1 is a diagram of a bias controlling system, according to an example.

Inertial sensors can be used to measure the rotational velocity of an object without a fix point for referencing. These devices can be used to indicate to a pilot information about travel, such as the direction of travel or course, and/or the direction toward which the ship is pointed, or heading. As an example, in a turn, a pilot first changes the rudder position. After some time, but not immediately, the ship's heading begins to change. After some further time, the course also changes. Course and heading can also differ when there is a current. The difference between the two is called the crab angle. An important useful aspect of the present subject matter, for a pilot, is the knowledge as to how soon and/or how rapidly the heading change is responding to the rudder, so that they can bring the rate of turn of heading to what experience tells them is needed for the course change that they are attempting. An inertial sensor can be used to accurately indicate to a pilot how much directional change their control input has resulted in.

A microelectromechanical system (MEMS) inertial sensor (such as a MEMS gyro) is a convenient tool for a pilot because it can be incorporated into a portable device due to its small size, weight and low cost, however other devices can be used, including, but not limited to a fiber-optic gyroscopes (FOG) or any other inertial sensor. The sensor can take advantage of the Coriolis Effect to produce inertial sense information. A MEMS resonator can be driven at a certain frequency and due to the inertia of the device the Coriolis force can excite another oscillation along a separate axis. This oscillation can be associated with the inertia of the resonator and can be measured, such as through capacitive methods.

Unfortunately, an inertial device such as a MEMS gyro can be susceptible to bias, or error, as mentioned above. Bias can affect a device consistently over time, and can vary over time. The magnitudes of the bias can be related to external factors such as temperature. Changes in gyro bias can be approximately linear to changes in external temperature. A bias of a first value can affect a device during power-on during a first period of use. A bias of a second value can affects the device during a second period of use other than the first period of use. Accordingly, a bias estimation or calibration can occur every time a device is powered up.

Users can select whether to estimate bias, and in some instances can deactivate bias estimation. Some inertial devices are affected by the same bias over time, and as such, a bias estimate can include multiple power-on sessions. Some devices are affected by bias that changes during power-on during a period of time, such as due to temperature fluctuation in the environment surrounding the sensor.

To mitigate the effects of bias, bias can be estimated and subtracted from the signal provided by the device to provide a calibrated signal. Examples disclosed herein can calibrate an inertial device, such as an inertial sensor, such as a MEMS sensor so that the device can provide a signal that accurately and/or precisely represents motion. A device can be calibrated to provide motion information that is within a desired range of actual motion affecting the device or a portion of the device. Accordingly, a bias that affects the motion signals from the device can be determined. A device can be calibrated to provide motion information within a determined range while the device is in use at a particular period of time and/or during a time period.

Through monitoring and processing multiple signals from the inertial device, bias can be determined over time. As disclosed herein, how the signals are processed affects whether the determined bias is within a desired tolerance of the actual motion affecting the device. Accordingly, processes can be selected to determine bias in an acceptable manner.

FIG. 1 is a diagram of a bias controlling system, according to an example. Output from a MEMS sensor 114, or any other rate-of-turn (ROT) sensor, can be calibrated, or modified with a correction value, under an assumption that a long-term average ROT output of the device is at or near zero. While the sensor 114 is in use, a system 100 can calibrate the sensor initially and can maintain the calibration thereafter.

A system 100 can maintain a bias estimating circuit 106 which it can subtract, such as by using an adjusted rate-of-turn determination circuit 104, from each biased ROT reading 102. It can output this value out as the calibrated display ROT, such as by using an output transmitter 112 to output a displayed rate of turn. It can slowly alters the bias estimate in the direction that would reduce the display ROT, so that the bias estimating circuit 106 approaches the average of the biased ROT readings, which is assumed to be equal to the bias.

Values used to guide the bias estimating circuit 106 toward the actual bias can be selected as a subset of all possible biased ROT readings 102. Biased ROT values used to estimate bias can be selected when the biased rate of turn 102 is below a threshold 110, and can be skipped when it is above the threshold 110, instead using a bias estimated before the threshold 110 was exceeded. The bias estimating circuit 106 can be determined as a weighted mean of bias values for respective biased ROT readings. Examples for determining the bias estimating circuit 106 are described below.

Figure 2:
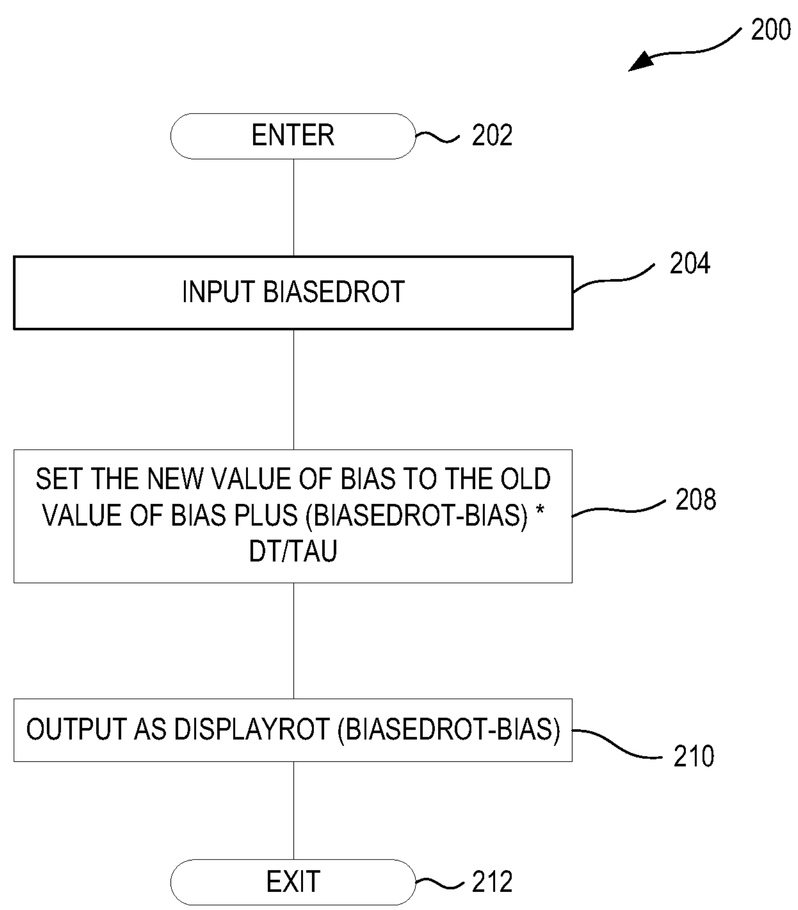
FIG. 2 is a flow-chart describing control of bias by increasing bias incrementally, according to an example.

FIG. 2 is a flow-chart describing control of bias by increasing bias incrementally, according to an example. A method such as the method 200 can estimate a bias affecting an inertial sensor. The method 200 can be entered and exited 202, such as during functioning alone or as part of another method. A method can include monitoring a plurality of rate-of-turn signals, from a sensor, in a sequence over time. A value such as BIASEDROT, which can represent a rate-of-turn that is biased, can be input at 204. In the example each of the rate-of-turn signals can include an actual bias value that is substantially constant or slowly changing over time.

A first bias value can be used as a bias. At 208, the first bias value is referenced as the OLD VALUE of bias. For a first rate-of-turn signal of the plurality of rate-of-turn signals, a second bias value can be determined. At 208 the second bias value is termed NEW VALUE. The second bias value can be sum of the bias, or OLD VALUE, plus a difference of the bias, or OLD VALUE, from the first rate-of-turn signal. At 208, the NEW VALUE of bias is set to the OLD VALUE of bias plus the difference BIASEDROT-BIAS. Accordingly, the bias can be updated by replacing the first bias value with the second bias value.

The difference can be multiplied by a constant. The difference can be multiplied by DT/TAU, illustrated at 208. The constant can be associated with a time interval, which at 208 is termed DT. The time interval can be the time between the transmission of the first rate-of-turn signal and the transmission of the previous rate-of-turn signal. The time interval can separate each of the plurality of rate-of-turn signals from an adjacent rate-of-turn signal in the sequence, such as the previous rate-of-turn signal. The time constant, illustrated as TAU at 208, can be associated with a bias sequence that can include a plurality of bias values. The sequence can include the bias, such as OLD VALUE and the second bias value, such as NEW VALUE. Each respective bias value of the plurality of bias values can be closer to the actual bias than a bias value determined prior to the respective bias value. An average of the plurality of bias values can grow closer to the actual bias over the sequence. An output rate of turn such as DISPLAYROT can be determined by subtracting the bias from the biased ROT, such as at 210. Zero can be used as the initial OLD VALUE of bias.

Figure 3:
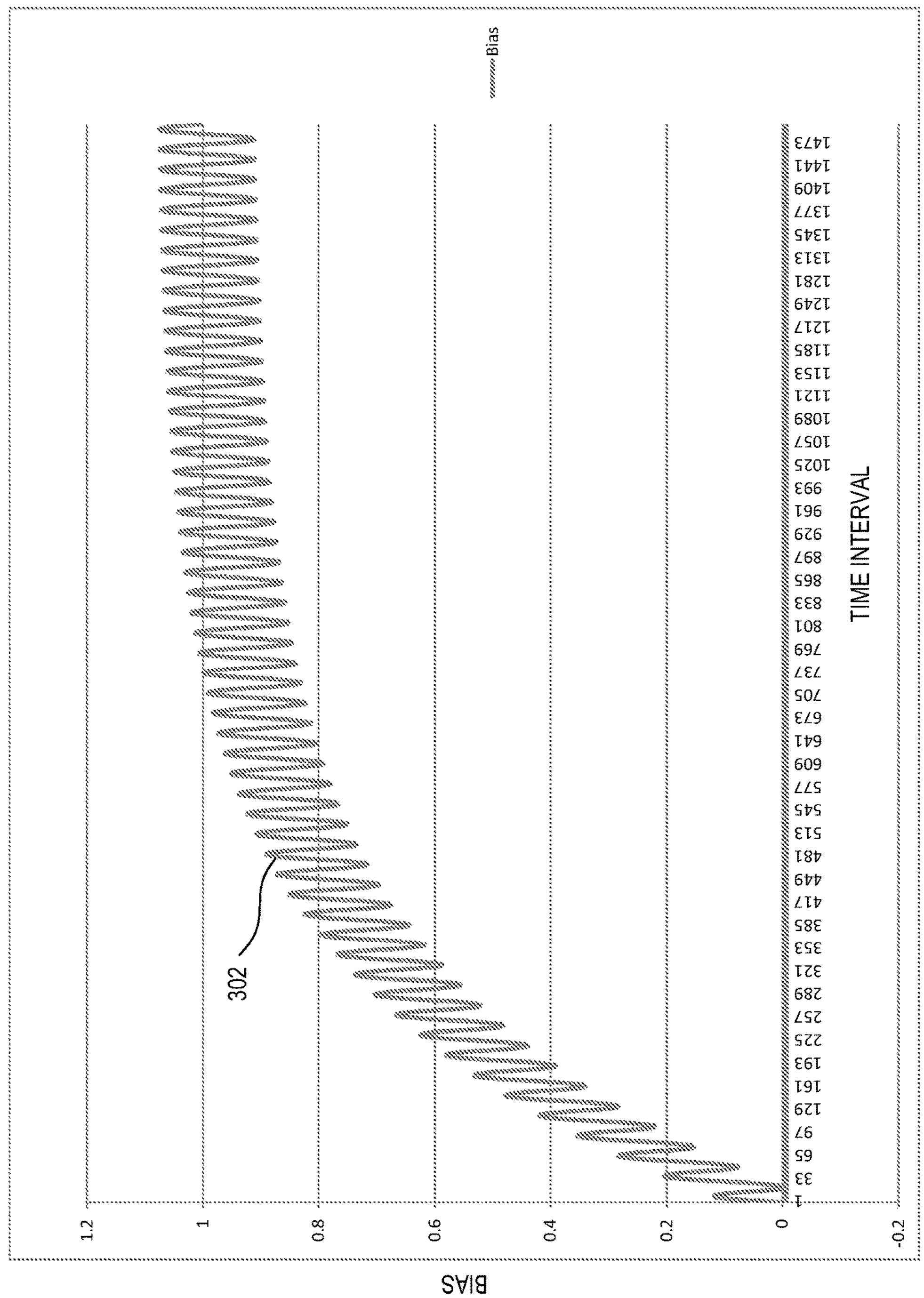
FIG. 3 is an example of bias adjustment under the flowchart of FIG. 2.

FIG. 3 is an example of bias adjustment under the flowchart of FIG. 2. In the example, the plurality of bias values 302 follow this pattern. The values included in the present figures are for illustration and, and for illustrations purposes demonstrate a regularity that may be not realized in application. Such a regular ROT waveform does resemble the actual ROT in that its true ROT component averages to zero. Thus, the present illustrations can used to show more clearly the bias content of the biased ROT and the response of the displayed ROT to the ROT estimate as it approaches the correct bias value over time. While there is some oscillation, overall, each new bias value is closer to the actual bias 1 than a previous bias value. The time constant of the exponential component of the estimated bias curve in FIG. 3 is the time constant TAU used in the multiplier DT/TAU in 208. The time constant can be a time constant of an exponential curve fit to the plurality of bias values.

Figure 4:
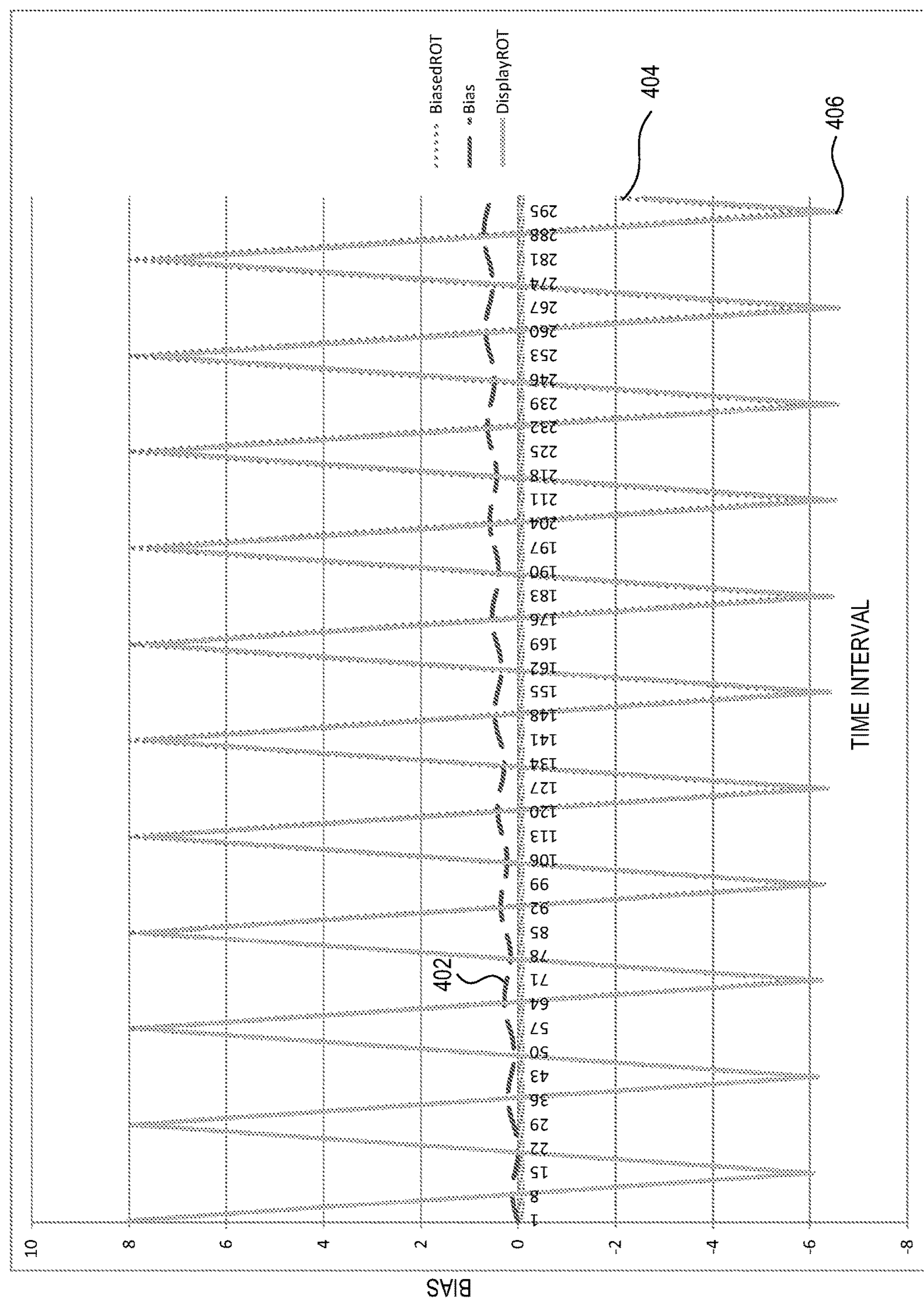
FIG. 4 is an example of rate-of-turn adjustment under the flowchart of FIG. 2.

The example can include determining a first adjusted rate-of-turn signal by subtracting the bias from the first rate-of-turn. The example can include putting out the first adjusted rate-of-turn. FIG. 4 is an example of rate-of-turn adjustment under the flowchart of FIG. 2. The plurality of Bias values 402 grow closer to the actual bias of 1 over time, and the DISPLAYEDROT 406 gradually grows away from the BIASEDROT 404.

A linear embodiment can multiply the display ROT by a fraction, DT/TAU, which can be small, to get an increment that can be added to the bias estimate, where DT is the time interval between additions and TAU is a time constant associated with the exponential convergence of the bias estimate. The following C-language function exemplifies such an embodiment:

```
double displayrot(double biasedrot) {
    static double bias;
  bias += (biasedrot − bias) * dt / tau;
    return biasedrot − bias;
}
```

Figure 5:
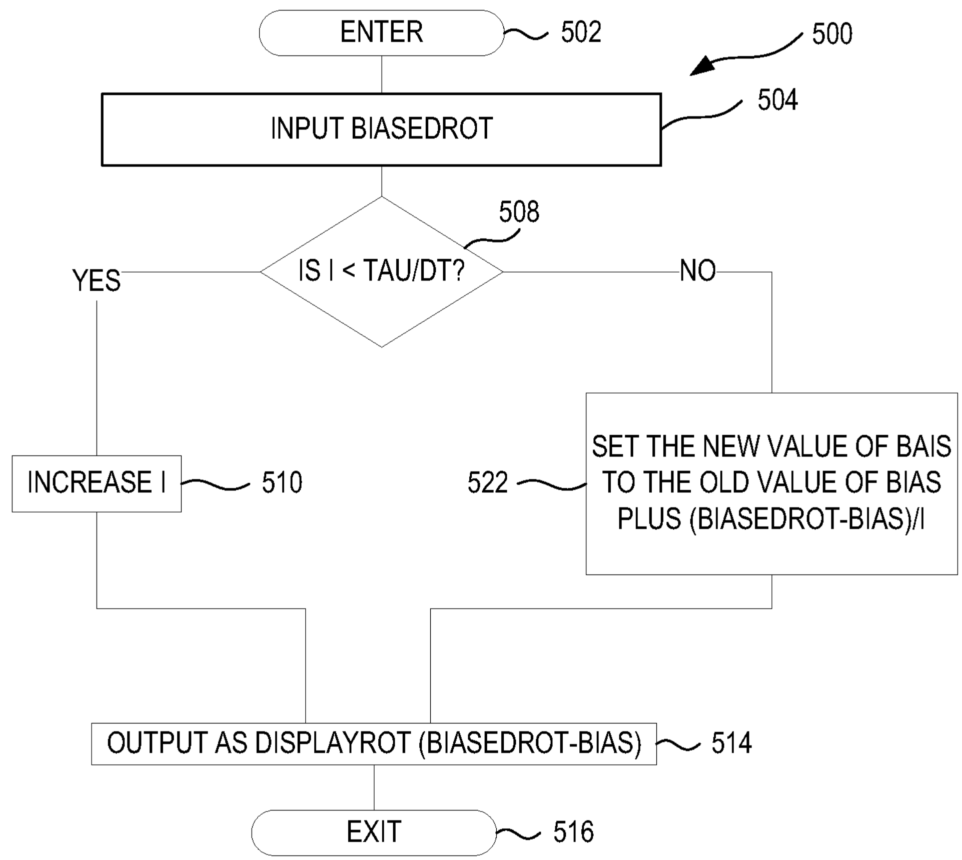
FIG. 5 is a flow chart showing rate-of-turn adjustment, according to an example.

FIG. 5 is a flow chart showing rate-of-turn adjustment, according to an example. The method is entered at 502 and exited at 516. A biased ROT, termed BIASEDROT at 504, can be input. The above mentioned constant can be associated with a counter value, and a second bias or NEW VALUE can be calculated at 522. At 508, the counter value, termed "I" can be increased 510 until it is greater than a ratio of a time constant divided by a time interval. The ratio can be TAU/DT, with TAU being a time constant and DT being a time interval. The counter value can be an integer. The counter value can be initialized to zero. At 514, BIASEDROT-BIAS can be output as DISPLAYROT.

Such a configuration can avoid an undesirably long startup time. An example can start with a large calibration fraction or constant. The large constant can be gradually reduced until the fraction corresponding to the desired time constant TAU and update-time interval DT is reached. Changing the calibration fraction can provide an initial calibration that is equivalent to an equally-weighted average. This can reduce or eliminate initial convergence time, at the expense of an initially noisier display. The following C-language function exemplifies such an embodiment:

```
double displayrot(double biasedrot) {
    static double bias;
    static int   i=0;
    if (i < tau / dt) i++;
  bias += (biasedrot − bias) / (double) i;
    return biasedrot − bias;
}
```

Figure 6:
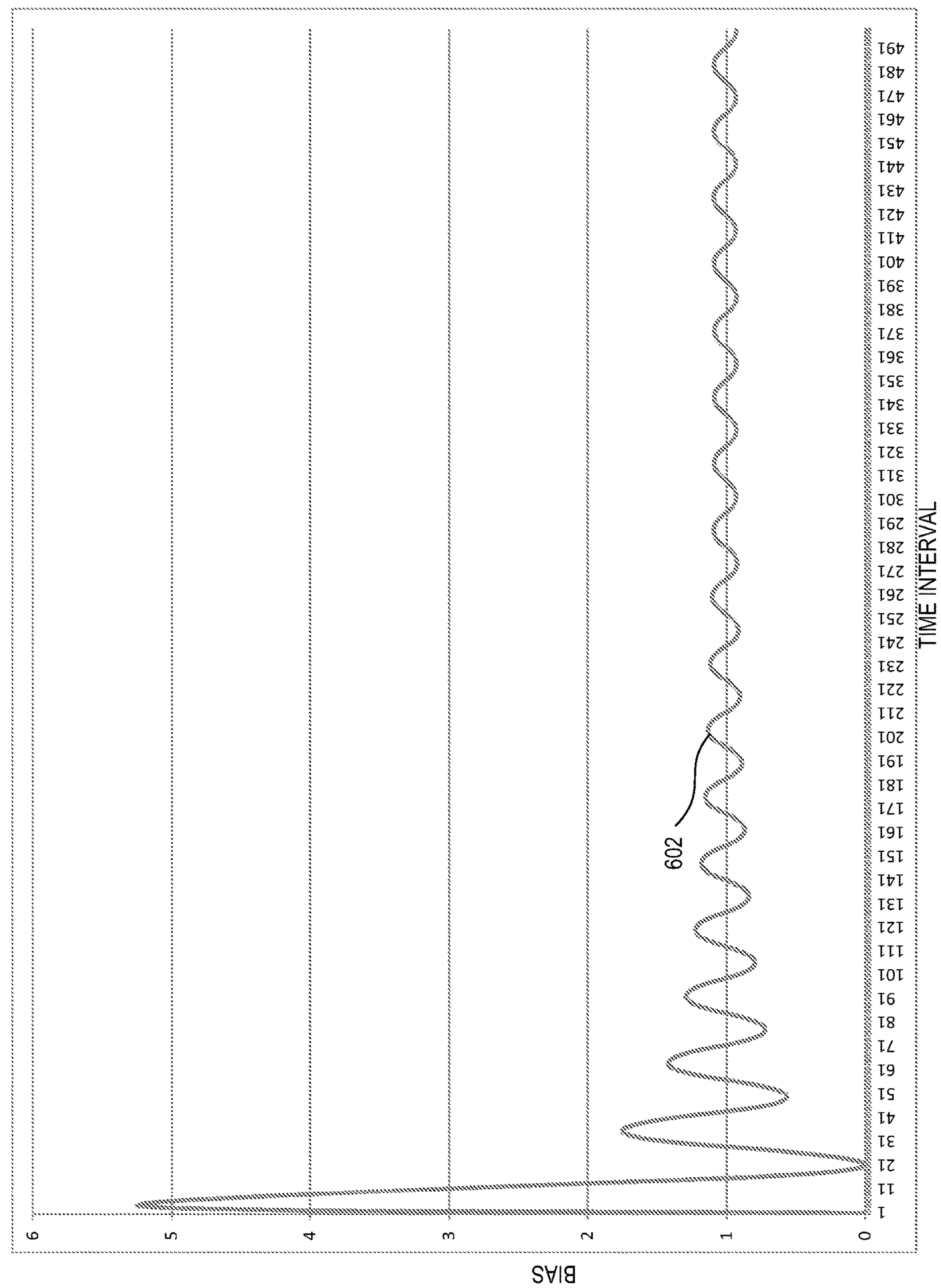
FIG. 6 is an example of bias adjustment under the flowchart of FIG. 5.
Figure 7:
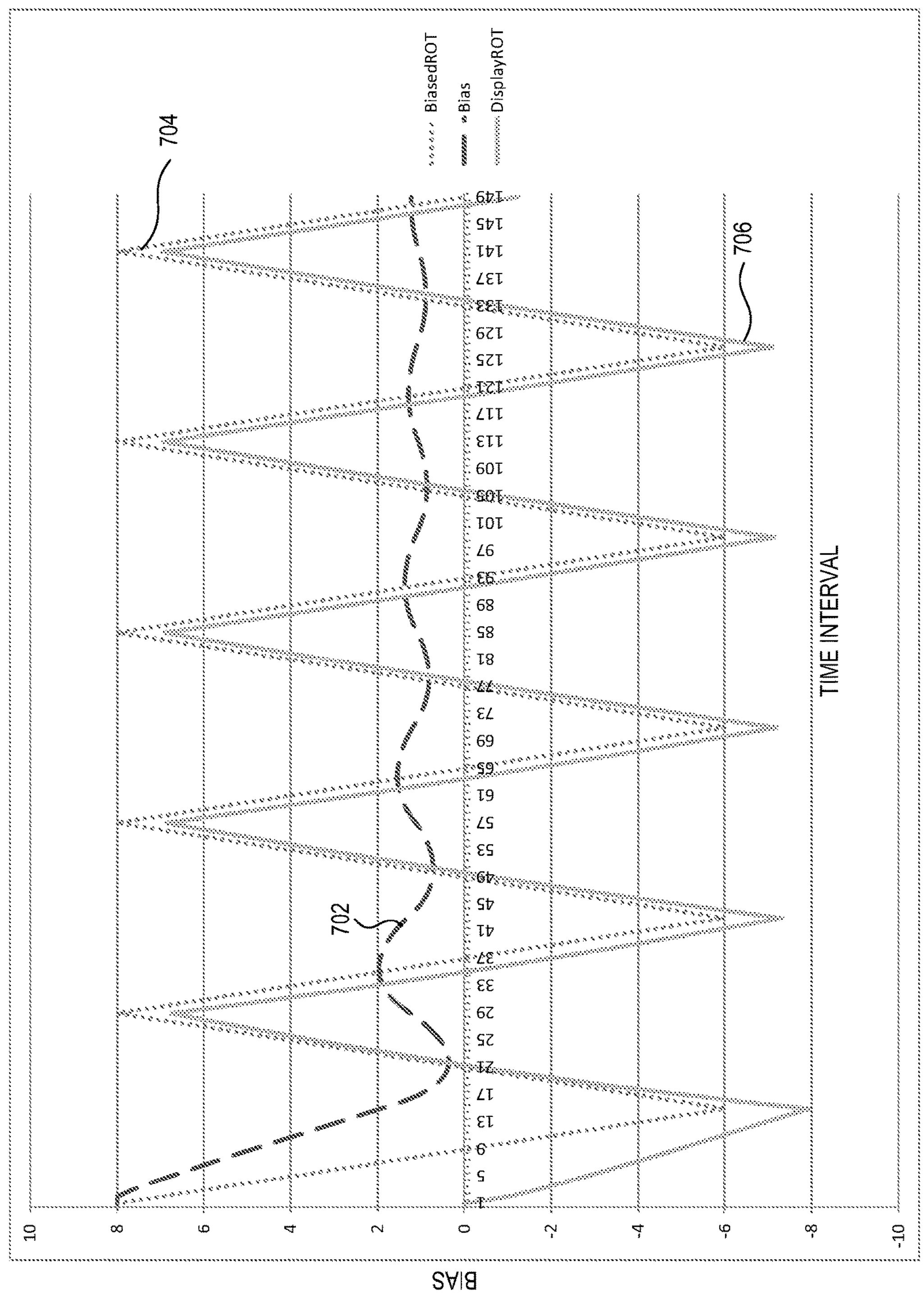
FIG. 7 is an example of rate-of-turn adjustment under the flowchart of FIG. 5.

FIG. 6 is an example of bias adjustment under the flowchart of FIG. 5. The plurality of bias values 602 converge to the actual bias 1. FIG. 7 is an example of rate-of-turn adjustment under the flowchart of FIG. 5. DIS- PLAYEDROT is initially quite far from BIASEDROT and the actual ROT, but grows close to the actual ROT over time.

Such a configuration can return zero the first time it is called, since its first bias estimate exactly equals the first biased-ROT sample:

bias[1]=biasedrot[1]

For each subsequent call (until i stops incrementing), it can return:

$$\begin{aligned} \text{bias}[i] &= \text{bias}[i-1] + (biasedrot[i] - \text{bias}[i-1])/i \\ &= (i-1) * \text{bias}[i-1]/i + biasedrot[i]/i \end{aligned}$$

At the ith call, biasedrot[i] can be weighted by 1/i and be added to the bias estimate. The former estimate can be deweighted by substituting 1/i for the former weight of 1/(1−i). The bias estimate can be an equally-weighted average of all the biased ROT samples, from 1 through i.

Figure 8:
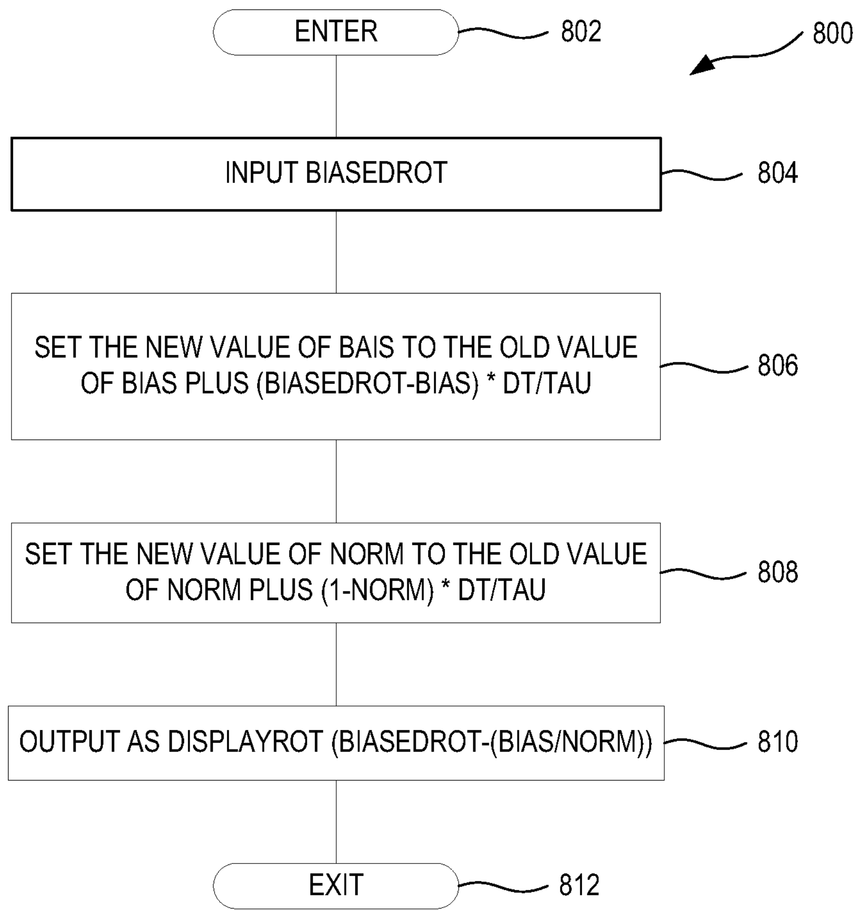
FIG. 8 is a flow chart showing bias determination using a linear filter, according to an example.

FIG. 8 is a flow chart showing bias determination using a linear filter, according to an example. A method such as the method 800 can estimate a bias affecting an inertial sensor. The method 800 can be entered and exited 802, such as during functioning alone or as part of another method. A method can include monitoring a plurality of rate-of-turn signals, from a sensor, in a sequence over time. A value such as BIASEDROT, which can represent a rate-of-turn that is biased, can be input at 804. In the example each of the rate-of-turn signals can include an actual bias value that is substantially constant or changing slowly over time.

A first bias value can be used as a bias. At 806, the first bias value is referenced as the OLD VALUE of bias. For a first rate-of-turn signal of the plurality of rate-of-turn signals, a second bias value can be determined. At 806 the second bias value is termed NEW VALUE. The second bias value can be sum of the bias, or OLD VALUE, plus a difference of the bias, or OLD VALUE, from the first rate-of-turn signal. At 806, the NEW VALUE of bias is set to the OLD VALUE of bias plus the difference BIASEDROT-BIAS. Accordingly, the bias can be updated by replacing the first bias value with the second bias value.

The difference can be multiplied by a constant. The difference can be multiplied by DT/TAU, illustrated at 806. The constant can be associated with a time interval, which at 806 is termed DT. The time interval can be the time between the transmission of the first rate-of-turn signal and the transmission of the previous rate-of-turn signal. The time interval can separate each of the plurality of rate-of-turn signals from an adjacent rate-of-turn signal in the sequence, such as the previous rate-of-turn signal. The time constant, illustrated as TAU at 806, can be associated with a bias sequence that can include a plurality of bias values. The sequence can include the bias, such as OLD VALUE and the second bias value, such as NEW VALUE. Each respective bias value of the plurality of bias values can be closer to the actual bias than a bias value determined prior to the respective bias value. An average of the plurality of bias values can grow closer to the actual bias over the sequence.

Such values can be dynamically normalized. A first normalizing value can be used as a normalizing value. At 806, the first normalizing value is referenced as the OLD VALUE of normalizing value. For a first rate-of-turn signal of the plurality of rate-of-turn signals, a second normalizing value can be determined. At 808 the second normalizing value is termed NEW VALUE. The second normalizing value can be sum of the normalizing value, or OLD VALUE, plus a difference of the normalizing value, or OLD VALUE, from the first rate-of-turn signal. At 806, the NEW VALUE of normalizing value is set to the OLD VALUE of normalizing value plus the difference NORMEDROT-NORM. Accordingly, the normalizing value can be updated by replacing the first normalizing value with the second normalizing value.

The difference can be multiplied by a constant. The difference can be multiplied by DT/TAU, illustrated at 808. The constant can be associated with a time interval, which at 808 is termed DT. The time interval can be the time between the transmission of the first rate-of-turn signal and the transmission of the previous rate-of-turn signal. The time interval can separate each of the plurality of rate-of-turn signals from an adjacent rate-of-turn signal in the sequence, such as the previous rate-of-turn signal. The time constant, illustrated as TAU at 808, can be associated with a normalizing value sequence that can include a plurality of normalizing values. The sequence can include the normalizing value, such as OLD VALUE and the second normalizing value, such as NEW VALUE. Each respective normalizing value of the plurality of normalizing values can be closer to the actual normalizing value than a normalizing value determined prior to the respective normalizing value. An average of the plurality of normalizing values can grow closer to the actual normalizing value over the sequence.

An output rate of turn such as DISPLAYROT can be determined by subtracting the bias, divided by normalizing value, from the biased ROT, such as at 810. Output curve shape can resemble those of FIGS. 6 and 7.

One advantage of normalization is that the filter is not necessarily constrained to a particular weighting. A simple implementation can be used from the start, without switching from one filter type, such as a boxcar filter, to another, such as an exponential filter. It can work with filter weighting to provide convergence to an initial bias estimate, even if such an estimate is noisy.

An exponential filter, as those set forth herein, can be used over a long-term time period. To dynamically normalize the weights that these approaches produce to the individual ROT samples, their output can be divided by the output of an identical filter whose input is the constant value 1:

```
double displayrot(double biasedrot) {
    static double bias;
    static double norm;
  bias += (biasedrot     - bias) * dt / tau;
    norm += (1.          - norm) * dt / tau;
    return biasedrot - bias / norm;
}
```

This approach can beneficially be used with various filter designs that provide a suitable long-term average. This approach can substantially reduce or completely eliminates abrupt transition from averaging only the initial samples to a long-term average that emphasizes the recent samples.

This approach can provide a weighted resulting average, with the sum of the constituent weights being 1 regardless of the filter design used. An example approach is as follows. Any linear filter design can put out a value f which is the weighted sum of all previous inputs, $f[i]=\text{sum}(w[-j]*\text{biasedrot}[i-j])$ for $j>=0$ where w[−j] can be the weight given to the jth sample taken before the present sample, biasedrot[i]. The corresponding normalizing filter can be $g[i]=\text{sum}(w[-j])$ for $j>=0$ Dividing f[i] by g[i] can produce as follows, $$
\begin{aligned}
f[i]/g[i] &= \text{sum}(w[-j]*biasedrot[i-j])/\text{sum}(w[-j]) \\
&= \text{sum}(w[-j]/\text{sum}(w[-j])*biasedrot[i-j]) \\
&= \text{sum}(w'[-j]*biasedrot[i-j])
\end{aligned}
$$

where w'[−j] can be the modified weight effectively given to sample biasedrot[i−j]. It can be shown that these modified weights are normalized to a sum of 1:

$$
\begin{aligned}
\text{sum}(w'[-j]) &= \text{sum}(w[-j]/\text{sum}(w[-j])) \\
&= \text{sum}(w[-j])/\text{sum}(w[-j]) \\
&= 1
\end{aligned}
$$

Figure 9:
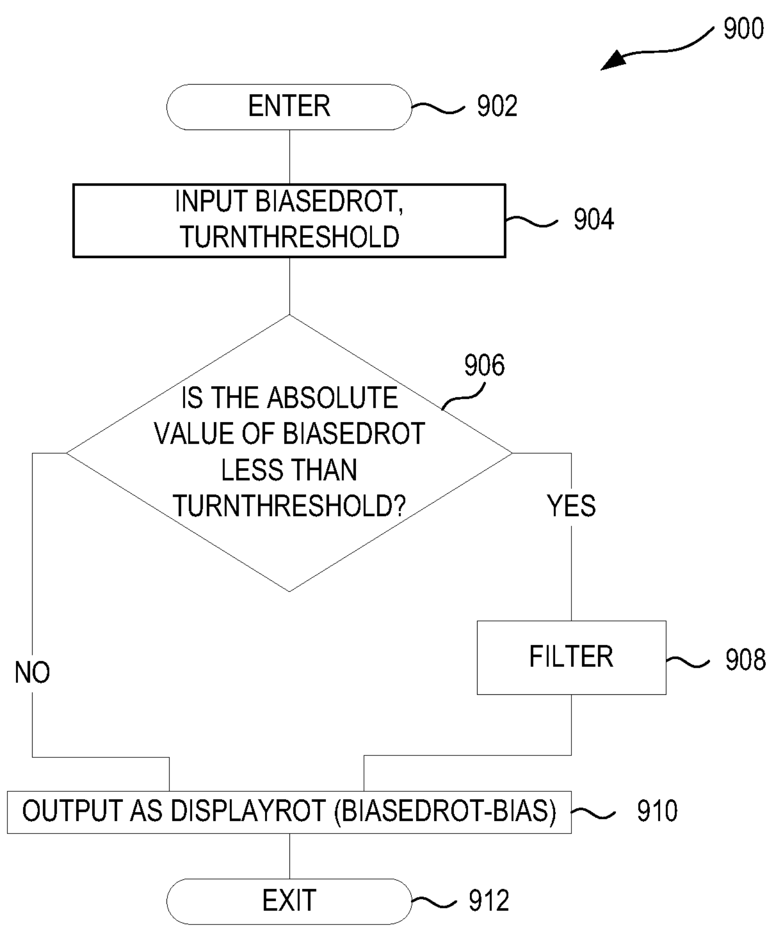
FIG. 9 is a flow chart showing bias determination using a threshold, according to an example.

FIG. 9 is a flow chart showing bias determination using a threshold, according to an example. The method is entered at 902 and exited at 912. A biased rate-of-turn, such as BIASEDROT, can be input at 904. A turn threshold, such as TURNTHRESHOLD, can be input at 904. When the first rate-of-turn is less than a selected threshold value, such as at 906, a filter 908 can be applied. Any of the filters disclosed herein can be applied. At 912, BIASEDROT-BIAS can be output as DISPLAYROT.

Such an approach can reduce contamination of the calibration process by deliberate or intentional turns, which may not meet the assumption of having a zero long-term average and can disturb the calibration initially by the imbalance of greater ROT magnitudes. The calibration process can be disabled when the absolute value of ROT exceeds a turn threshold. The following C-language function exemplifies such an embodiment:

```
double displayrot(double biasedrot, double turnthreshold) {
    static double bias;
    static int   i;
    if (fabs(biasedrot) < turnthreshold) {
        if (i < tau / dt) i++;
      bias += biasedrot − bias / (double) i;
    }
    return biasedrot − bias;
}
```

The threshold can be in units of angle (degrees) divided by units of time (e.g., minutes for a vessels ROT). The threshold can be from around 10 to around 15 degrees per minute. The turn threshold can be low enough to detect deliberate turns but high enough to ignore the random yawing that occurs when the ship is trying to follow a constant course. The threshold can be set by a pilot. Although the threshold is applied to biased ROT values, the sensor accuracy to detect turns can be less than that required for display and within the capability of MEMS devices. Large-amplitude impulsive short-term sensor errors can exceed the turn threshold and be excluded from the calibration process.

Figure 10:
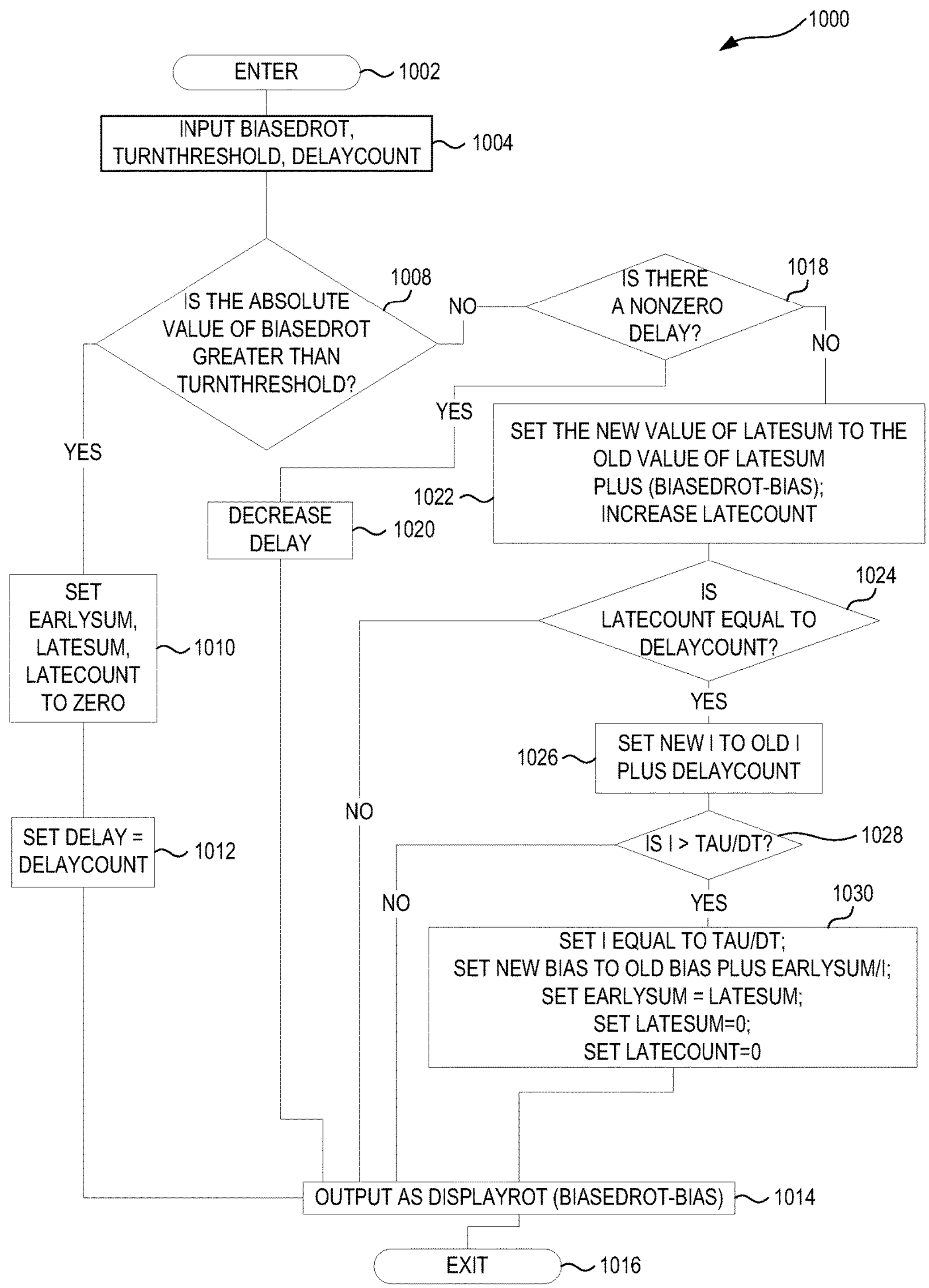
FIG. 10 is a flow chart showing bias determination using a threshold and a delay, according to an example.

FIG. 10 is a flow chart showing bias determination using a threshold and a delay, according to an example. The example of FIG. 9 can be augmented by storing the second bias value in a buffer. The method is entered at 1002 and exited at 1016. A biased ROT, termed BIASEDROT at 1004, as can a threshold, such as TURNTHRESHOLD and a delay count such as DELAYCOUNT. At 1008 the biased ROT is monitored to determine if it exceeds a threshold such as TURNTHRESHOLD.

A buffer can include EARLYSUM and LATESUM into one or both of which bias-correction values, such as BIASEDROT-BIAS, can accumulated and counted, such as by EARLYCOUNT and LATECOUNT in 1022 and 1030, respectively. The EARLYSUM part of the buffer can be used in 1030 to update the BIAS when the LATESUM part of the buffer becomes full. LATESUM can be transferred into the EARLYSUM. The entire buffer can be cleared in 1010 when the biased ROT exceeds the selected threshold value, thus as by excluding the buffer contents from use in updating the BIAS in 1030.

A DELAY can be set in 1012. The DELAY can be tested in 1018. The DELAY can be decreased incrementally at 1020 and can reduce or prevent new accumulation into the buffer until sometime after the BIASEDROT has fallen below the threshold. Intentional turn-exclusion can be enhanced by accumulating and delaying displayed-ROT values before slowly adding them to the bias estimate. When a turn is detected, a method can dump recent accumulation, such as to ensure that little or no part of the intentional turn goes into the calibration. When the turn ends, the method can add a delay before resuming accumulation to the bias values. The following C-language function exemplifies such an embodiment:

```
double displayrot(double biasedrot, double turnthreshold, int delaycount) {
    static double bias;
    static int   delay;
    static double earlysum;
    static int   i;
    static double latecount;
    static double latesum;
    if (fabs(biasedrot) > turnthreshold) {
        earlysum = 0;
        latesum = 0;
        latecount = 0;
        delay = delaycount;
    }
    else if (delay) delay−−;
    else {
        latesum += biasedrot − bias;
        latecount++;
        if (latecount == delaycount) {
            i += delaycount;
            if (i > tau / dt) i = tau / dt;
          bias += earlysum / (double) i;
            earlysum = latesum;
            latesum = 0;
            latecount = 0;
    }
    return biasedrot − bias;
}
```

Figure 11:
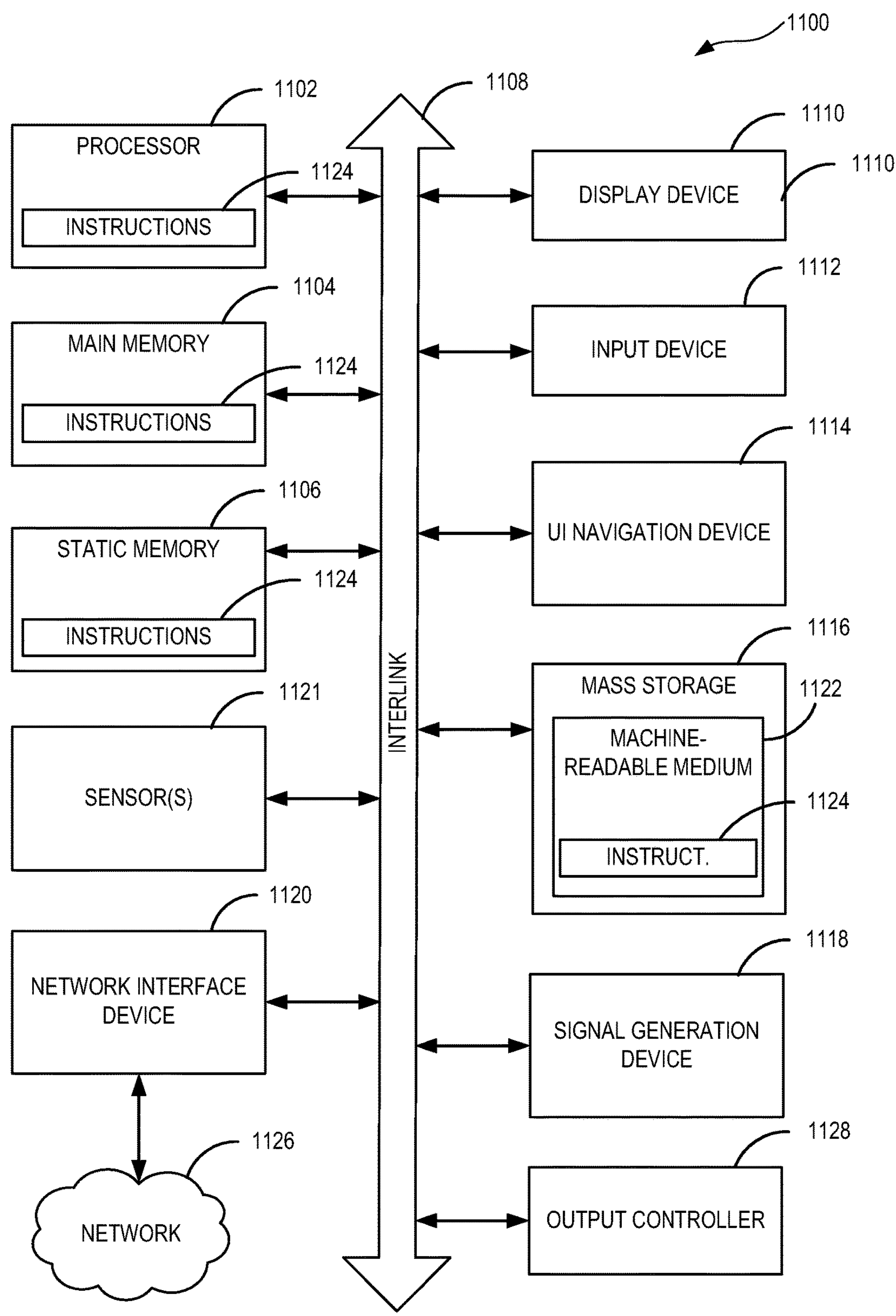
FIG. 11 is a block diagram illustrating an example of a machine upon which one or more embodiments may be implemented.

FIG. 11 illustrates a block diagram of an example circuit 1100 which can be used in conjunction with any of the examples discussed herein. The circuit 1100 can operate as a standalone device or can be connected (e.g., networked) to other circuits. The circuit 1100 can form all or a part of a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. The term "circuit" can include any collection of circuits that individually or jointly execute a set (or multiple sets) of instructions to perform any one or more of the systemologies discussed herein, such as cloud computing, software as a service (SaaS), other computer cluster configurations. Insofar as circuit examples include software, such software can reside on a machine readable medium. Software, when executed by hardware, can cause the hardware to perform a function.

Circuit (e.g., computer system) 1100 can include a hardware processor 1102 (e.g., a central processing unit (CPU), a graphics processing unit (GPU), a hardware processor core, or any combination thereof), a main memory 1104 and a static memory 1106, some or all of which can communicate with each other via an interlink (e.g., bus) 1108. The circuit 1100 can further include a display unit 1110, an alphanumeric input device 1112 (e.g., a keyboard), and a user interface (UI) navigation device 1114 (e.g., a mouse). The display unit 1110, input device 1112 and UI navigation device 1114 can be a touch screen display. The circuit 1100 can additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The circuit 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 can include a machine readable medium 1122 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the circuit 1100. In an example, one or any combination of the hardware processor 1102, the main memory 1104, the static memory 1106, or the storage device 1116 can constitute machine readable media.

While the machine readable medium 1122 is illustrated as a single medium, the term “machine readable medium” can include a single medium or multiple media (e.g., a centralized or distributed database, and/or associated caches and servers) that configured to store the one or more instructions 1124.

The term “machine readable medium” can include any medium that is capable of storing, encoding, or carrying instructions for execution by the circuit 1100 and that cause the circuit 1100 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 1124 can further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. The network interface device 1120 can include one or more physical jacks (e.g., Ethernet, coaxial, or phone jacks) or one or more antennas to connect to the communications network 1126. The network interface device 1120 can include a plurality of antennas to wirelessly communicate using at least one of single-input multiple-output (SIMO), multiple-input multiple-output (MIMO), or multiple-input single-output (MISO) techniques. The term “transmission medium” shall be taken to include any intangible medium that is capable of storing, encoding or carrying instructions for execution by the circuit 1100, and includes digital or analog communications signals or other intangible medium to facilitate communication of such software.

A system example for estimating a bias affecting an inertial sensor can include a sensor configured to produce a plurality of rate-of-turn signals in a sequence over time, such as at 1121. In the example, each of the rate-of-turn signals can include an actual bias value that is substantially constant for each of the plurality of rate-of-turn signals. The example can include a storage circuit, such as at 1106, to store as a bias a first bias value associated with a first rate-of-turn signal of the plurality of rate-of-turn signals. Although a static memory is illustrated, other memory can be used. The example can include a bias determining circuit coupled to the storage circuit and configured to, for a first rate-of-turn signal of the plurality of rate-of-turn signals, determine a second bias value by summing the bias with a difference of the bias from the first rate-of-turn signal, multiplied by a constant, and to update the bias by replacing the first bias value with the second bias value. Such as circuit can comprise a stand-alone circuit, such as a circuit board or an ASIC that communicate over the bus 1108. The circuit can comprise instructions 1124 on the processor 1102. The example can include an adjusted rate-of-turn determination circuit coupled to the bias value determining circuit and the storage circuit and configured to determine a first adjusted rate-of-turn signal by subtracting the bias from the first rate-of-turn. Such as circuit can comprise a stand-alone circuit, such as a circuit board or an ASIC that communicate over the bus 1108. The circuit can comprise instructions 1124 on the processor 1102. The example can include an output transmitter, such as the output controller 1128, in communication with the first adjust rate-of-turn determination circuit, the output transmitter configured to output the first adjusted rate-of-turn to electronics. The output transmitter can be a wireless transmitter configured to wirelessly output the first adjusted rate-of-turn to electronics. A wireless transmitter can comprise a Bluetooth transmitter configured to communicate using the Bluetooth standard. A display can be coupled to the output transmitter to display visual indicia associated with the first adjusted rate-of-turn. Such a display can include a video screen, an electronically controlled compass that can be embodied in video, and the like.

Various examples can communication using a protocol adapted to be compatible with the Bluetooth™ wireless communication system. The Bluetooth™ wireless communication system can operate on an unlicensed 2.4 GHz Industrial, Scientific and Medical (ISM) band. Devices adapted for compatibility with the communication system can be capable of providing real-time audio-video and data communication. Copyrights to the Bluetooth™ wireless communication system specification are owned by the Promoter Members of Bluetooth SIG, Inc. The scope of the present subject matter includes wireless communications adapted to be compatible with the Bluetooth™ Specification, specifically, at least v1.2, available at http://www.bluetooth.com (last visited Jan. 26, 2004).

The storage circuit can comprise a machine readable medium including instructions 1124 that, when executed by a component of a machine, cause the machine to perform operations to store the bias associated with the first rate-of-turn signal of the plurality of rate-of-turn signals.

The bias determining circuit can comprise a machine readable medium including instructions 1124 that, when executed by a component of a machine, cause the machine to perform operations to determine the second bias value by summing the bias value with a difference of the bias from the first rate-of-turn signal, multiplied by the constant.

The adjusted rate-of-turn determination circuit comprises a machine readable medium including instructions 1124 that, when executed by a component of a machine, cause the machine to perform operations to determine a first adjusted rate-of-turn signal by subtracting the second bias value from the first rate-of-turn.

A bias determining circuit is configured to determine a second bias value by summing the bias with a difference of the bias from the first rate-of-turn signal, multiplied by a constant when the first rate-of-turn is less than a selected threshold value. The example can optionally update the bias by replacing the first bias value with the second bias value when the first rate-of-turn is less than the selected threshold value.

A storage circuit such as one or both of the memories 1104 and 1106 can include a buffer configured to store a sequence of bias values including the first bias value and the second bias value can optionally include the subject matter of any of the preceding examples, wherein the bias determining circuit is configured to clear the buffer when the first rate-of-turn is greater than the selected threshold value and to determine the first adjusted rate-of-turn signal by subtracting the second bias value from the first rate-of-turn, when the first rate-of-turn is less than the selected threshold value. The bias determining circuit is configured to update the bias with the second bias value from the buffer when the buffer is full.

Additional Notes & Examples

Example 1 includes subject matter (such as a device, apparatus, or network interface device for bias estimation) comprising a method that can estimate a bias affecting an inertial sensor. The example can include monitoring a plurality of rate-of-turn signals, from a sensor, in a sequence over time. In the example each of the rate-of-turn signals includes an actual bias value that is substantially constant for each of the plurality of rate-of-turn signals. The example can include storing a first bias value as a bias. The example can include, for a first rate-of-turn signal of the plurality of rate-of-turn signals, determining a second bias value. The example is included wherein the second bias value is a sum of the bias plus a difference of the bias from the first rate-of-turn signal multiplied by a constant and updating the bias by replacing the first bias value with the second bias value. The example can include determining a first adjusted rate-of-turn signal by subtracting the bias from the first rate-of-turn. The example can include putting out the first adjusted rate-of-turn.

Example 2 can optionally include the subject matter of example 1, wherein the constant is associated with a time interval between the first rate-of-turn signal and a previous rate-of-turn signal.

Example 3 can optionally include the subject matter of any of the preceding examples, wherein the time interval separates each of the plurality of rate-of-turn signals from an adjacent rate-of-turn signal in the sequence.

Example 4 can optionally include the subject matter of any of the preceding examples, wherein the constant is associated with a time constant associated with a bias sequence that includes a plurality of bias values, including the bias and the second bias value, with an average of the plurality of bias values growing closer to the actual bias over the sequence.

Example 5 can optionally include the subject matter of any of the preceding examples, wherein the time constant is a time constant of an exponential curve.

Example 6 can optionally include the subject matter of any of the preceding examples, wherein the constant includes the time interval divided by the time constant.

Example 7 can optionally include the subject matter of any of the preceding examples, wherein the constant is associated with a counter value that is increased until it is greater than a ratio of a time constant divided by a time interval. The example can include subject matter wherein the time interval is the time between the first rate-of-turn signal and a previous rate-of-turn signal. The example can include subject matter wherein the time constant is associated with a bias sequence, including the bias and second bias value, that includes a plurality of bias values, with each respective bias value of the of the plurality of bias values closer to the actual bias than the bias value determined prior to the respective bias value.

Example 8 can optionally include the subject matter of any of the preceding examples, wherein the counter value is an integer.

Example 9 can optionally include the subject matter of any of the preceding examples, wherein determining the second bias value comprises determining the second bias value when the first rate-of-turn is less than a selected threshold value and updating the bias by replacing the first bias value with the second bias value when the first rate-of-turn is less than the selected threshold value.

Example 10 can optionally include the subject matter of any of the preceding examples, wherein determining the second bias value comprises storing the second bias value in a buffer. The example can include clearing the buffer when the first rate-of-turn is greater than the selected threshold value. The example can include updating the bias with the second bias value from the buffer when the first rate-of-turn is less than the selected threshold value.

Example 11 can optionally include the subject matter of any of the preceding examples, wherein updating the bias with the second bias value from the buffer includes updating when the buffer is full.

Example 12 can optionally include the subject matter of any of the preceding examples, wherein clearing the buffer includes clearing a set of rate-of-turn values from the buffer.

Example 13 can optionally include the subject matter of any of the preceding examples, wherein monitoring the sensor includes monitoring a signal from a microelectromechanical inertial sensor.

Example 14 includes subject matter (such as a device, apparatus, or network interface device for reduced host sleep interruption) comprising an example for estimating a bias affecting an inertial sensor. The example can include a sensor configured to produce a plurality of rate-of-turn signals in a sequence over time. In the example, each of the rate-of-turn signals can include an actual bias value that is substantially constant for each of the plurality of rate-of-turn signals. The example can include a storage circuit to store as a bias a first bias value associated with a first rate-of-turn signal of the plurality of rate-of-turn signals. The example can include a bias determining circuit coupled to the storage circuit and configured to, for a first rate-of-turn signal of the plurality of rate-of-turn signals, determine a second bias value by summing the bias with a difference of the bias from the first rate-of-turn signal, multiplied by a constant, and to update the bias by replacing the first bias value with the second bias value. The example can include an adjusted rate-of-turn determination circuit coupled to the bias value determining circuit and the storage circuit and configured to determine a first adjusted rate-of-turn signal by subtracting the bias from the first rate-of-turn. The example can include an output transmitter in communication with the first adjust rate-of-turn determination circuit, the output transmitter configured to output the first adjusted rate-of-turn to electronics.

Example 15 can optionally include the subject matter of any of the preceding examples, wherein the storage circuit comprises a machine readable medium including instructions that, when executed by a component of a machine, cause the machine to perform operations to store the bias associated with the first rate-of-turn signal of the plurality of rate-of-turn signals.

Example 16 can optionally include the subject matter of any of the preceding examples, wherein the bias determining circuit comprises a machine readable medium including instructions that, when executed by a component of a machine, cause the machine to perform operations to determine the second bias value by summing the bias value with a difference of the bias from the first rate-of-turn signal, multiplied by the constant.

Example 17 can optionally include the subject matter of any of the preceding examples, wherein the adjusted rate-of-turn determination circuit comprises a machine readable medium including instructions that, when executed by a component of a machine, cause the machine to perform operations to determine a first adjusted rate-of-turn signal by subtracting the second bias value from the first rate-of-turn.

Example 18 can optionally include the subject matter of any of the preceding examples, including a display coupled to the output transmitter to display visual indicia associated with the first adjusted rate-of-turn.

Example 19 can optionally include the subject matter of any of the preceding examples, wherein the output transmitter is a wireless transmitter configured to wirelessly output the first adjusted rate-of-turn to electronics Example 20 can optionally include the subject matter of any of the preceding examples, wherein the wireless transmitter is a Bluetooth transmitter.

Example 21 can optionally include the subject matter of any of the preceding examples, wherein the bias determining circuit is configured to determine a second bias value by summing the bias with a difference of the bias from the first rate-of-turn signal, multiplied by a constant when the first rate-of-turn is less than a selected threshold value. The example can optionally update the bias by replacing the first bias value with the second bias value when the first rate-of-turn is less than the selected threshold value.

Example 22 can optionally include the subject matter of any of the preceding examples, wherein the storage circuit includes a buffer configured to store a sequence of bias values including the first bias value and the second bias value can optionally include the subject matter of any of the preceding examples, wherein the bias determining circuit is configured to clear the buffer when the first rate-of-turn is greater than the selected threshold value and to determine the first adjusted rate-of-turn signal by subtracting the second bias value from the first rate-of-turn, when the first rate-of-turn is less than the selected threshold value.

Example 22 can optionally include the subject matter of any of the preceding examples, wherein the bias determining circuit is configured to update the bias with the second bias value from the buffer when the buffer is full.

Example 23 includes subject matter (such as a device, apparatus, or network interface device for reduced host sleep interruption) comprising an example for estimating a bias affecting an inertial rate-of-turn sensor. The example can include a microelectromechanical inertial sensor configured to produce a plurality of rate-of-turn signals in a sequence over time can optionally include the subject matter of any of the preceding examples, wherein each of the rate-of-turn signals includes an actual bias value that is substantially constant for each of the plurality of rate-of-turn signals. The example can include a static memory to store as a bias a first bias value associated with a first rate-of-turn signal of the plurality of rate-of-turn signals. The example can include a bias determining circuit coupled to the static memory and configured to, for a first rate-of-turn signal of the plurality of rate-of-turn signals, determine a second bias value by summing the bias with a difference of the bias from the first rate-of-turn signal, multiplied by a constant, and to update the static memory by replacing the first bias value with the second bias value. The example can include an adjusted rate-of-turn determination circuit coupled to the bias value determining circuit and the static memory and configured to determine a first adjusted rate-of-turn signal by subtracting the bias from the first rate-of-turn. The example can include a wireless transmitter in communication with the first adjust rate-of-turn determination circuit, the wireless transmitter configured to output the first adjusted rate wirelessly. The example can include a battery to power the example.

Example 24 can optionally include the subject matter of any of the preceding examples, wherein the bias determining circuit is configured to determine a second bias value by summing the bias with a difference of the bias from the first rate-of-turn signal, multiplied by a constant when the first rate-of-turn is less than a selected threshold value and update the bias by replacing the first bias value with the second bias value when the first rate-of-turn is less than the selected threshold value.

Example 25 can optionally include the subject matter of any of the preceding examples, wherein the static memory includes a buffer configured to store a sequence of bias values including the first bias value and the second bias value can optionally include the subject matter of any of the preceding examples, wherein the bias determining circuit is configured to clear the buffer when the first rate-of-turn is greater than the selected threshold value and to determine the first adjusted rate-of-turn signal by subtracting the second bias value from the first rate-of-turn, when the first rate-of-turn is less than the selected threshold value.

Example 26 can optionally include the subject matter of any of the preceding examples, wherein the bias determining circuit is configured to update the bias with the second bias value from the buffer when the buffer is full.

Example 27 can include any of the preceding examples, wherein the example is disposed in one of a computer, a wireless communicator, a hand-held device, an automobile, an agricultural implement such as a tractor, a marine vessel, a locomotive, an aircraft, a watercraft, and a spacecraft.

Example 28 can optionally include the subject matter of any of the preceding examples, including monitoring a plurality of rate-of-turn samples or measurements, from the inertial sensor, in a sequence over time. In the example, each of the plurality of rate-of-turn measurements can include an actual bias value that is substantially constant for each of the plurality of rate-of-turn measurements. The example can include estimating a respective bias value for each of the plurality of rate-of-turn measurements. The example can include determining an adjusted rate-of-turn measurement as a weighted average of the plurality of rate-of-turn measurements weighted by the respective bias. The example can include putting out the adjusted rate-of-turn.

Example 29 can optionally include the subject matter of any of the preceding examples, wherein estimating a respective bias value for a first rate-of-turn measurement includes storing a first bias value as a respective bias and for a first rate-of-turn measurement of the plurality of rate-of-turn measurements, determining a second bias value. In the example, the second bias value can be a sum of the bias plus a difference of the bias from the first rate-of-turn measurement. The example can include updating the respective bias by replacing the first bias value with the second bias value and determining the first adjusted rate-of-turn measurement by subtracting the respective bias from the first rate-of-turn.

Example 30 can optionally include the subject matter of any of the preceding examples, wherein the second bias value is multiplied by a constant before updating.

Example 31 can optionally include the subject matter of any of the preceding examples, wherein the constant is an exponential curve fit to a plurality of respective bias values.

Example 32 can optionally include the subject matter of any of the preceding examples, wherein the constant is associated with a time interval between the first rate-of-turn measurement and a previous rate-of-turn measurement.

Example 33 can optionally include the subject matter of any of the preceding examples, wherein the time interval separates each of the plurality of rate-of-turn measurements from an adjacent rate-of-turn measurement in the sequence.

Example 34 can optionally include the subject matter of any of the preceding examples, wherein the constant is associated a bias sequence that includes a plurality of bias values, including the bias and the second bias value, with an average of the plurality of bias values growing closer to the actual bias over the sequence.

Example 35 can optionally include the subject matter of any of the preceding examples, wherein the constant is associated with a counter value that is increased until it is greater than a ratio of a time constant divided by a time interval, wherein the time interval is the time between the first rate-of-turn measurement and a previous rate-of-turn measurement, and wherein the time constant is associated with a bias sequence, including the bias and second bias value, that includes a plurality of bias values, with each respective bias value of the of the plurality of bias values closer to the actual bias than the bias value determined prior to the respective bias value.

Example 36 can optionally include the subject matter of any of the preceding examples, wherein the counter value is an integer.

Example 37 can optionally include the subject matter of any of the preceding examples, wherein the time constant is a time constant of an exponential curve.

Example 38 can optionally include the subject matter of any of the preceding examples, wherein the constant includes the time interval divided by the time constant.

Example 39 can optionally include the subject matter of any of the preceding examples, wherein estimating a respective bias value for a first rate-of-turn measurement includes: storing a first normalizing value as a normalizing value; and for a first rate-of-turn measurement of the plurality of rate-of-turn measurements, determining a second normalizing value, wherein the second normalizing value is a sum of the normalizing value plus a difference of the normalizing value from unity. The example can include updating the normalizing value by replacing the first normalizing value with the second normalizing. The example can include determining the first adjusted rate-of-turn measurement by subtracting the respective bias from the first rate-of-turn includes dividing the respective bias by the second normalizing value.

Example 40 can optionally include the subject matter of any of the preceding examples, wherein the second normalizing value is multiplied by a constant before updating.

Example 41 can optionally include the subject matter of any of the preceding examples, wherein the time constant is a time constant of an exponential curve.

Example 42 includes subject matter (such as a device, apparatus, or network interface device for reduced host sleep interruption) comprising an example method to estimate a bias affecting an inertial sensor. The example can include monitoring a plurality of rate-of-turn samples, from the inertial sensor, in a sequence over time, wherein each of the plurality of rate-of-turn samples includes substantially the same actual bias value that is included in each of the plurality of other rate-of-turn samples. The example can include estimating the bias as a weighted average of the plurality of rate-of-turn samples. The example can include determining an adjusted rate-of-turn sample by subtracting the bias from an instant rate-of-turn sample of the plurality of rate-of-turn samples. The example can include putting out the adjusted rate-of-turn.

Example 43 can optionally include the subject matter of any of the preceding examples, wherein the weighted average includes an exponentially-weighted average.

Example 44 can optionally include the subject matter of any of the preceding examples, wherein estimating the bias includes determining a difference between each of the plurality of rate-of-turn samples and the bias. The example can include dividing each difference by a divisor less than 1 to produce a scaled difference. The example can include adding the scaled difference to the bias to produce a subsequent bias estimate. The example can include determining a subsequent adjusted rate-of-turn by subtracting the subsequent bias estimate from a subsequent rate-of-turn sample of the plurality of rate-of-turn samples. The example can include putting out the subsequent rate-of-turn sample.

Example 45 can optionally include the subject matter of any of the preceding examples, wherein the weights of the weighted average are dynamically varied to initialize the estimating by emphasizing initial samples of the plurality of rate-of-turn samples.

Example 46 can optionally include the subject matter of any of the preceding examples, wherein the estimating includes a uniform weighting of a first set of samples preceding an exponential weighting. The example can include computing a difference between each sample and a current bias estimate. The example can include numbering each of the plurality of rate-of-turn samples. The example can include for a rate-of-turn sample number n of the plurality of rate-of-turn samples, subtracting the bias from the rate-of-turn sample number n to produce a difference and dividing the difference by a lesser of n and a value that is approximately a quotient of an exponential time constant and an interval between samples to produce a scaled difference. The example can include adding the scaled difference to the bias estimate to form a subsequent bias estimate.

Example 47 can optionally include the subject matter of any of the preceding examples, including dividing each successive bias estimate by a value resulting from substituting each actual sample in the weighted average by the constant value 1.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method to estimate a bias affecting an inertial sensor used in navigation of a vessel, the method comprising:

monitoring a plurality of rate-of-turn samples, from the inertial sensor, in a sequence over time, wherein each of the plurality of rate-of-turn samples includes a substantially identical actual bias value as is included in each of the plurality of other rate-of-turn samples;

estimating the bias as a weighted average of the plurality of rate-of-turn samples;

determining an adjusted rate-of-turn sample by subtracting the bias from an instant rate-of-turn sample of the plurality of rate-of-turn samples;

outputting the adjusted rate-of-turn sample;

calibrating the inertial sensor based on the adjusted rate-of-turn sample to provide motion information that is within a range of actual motion affecting the inertial sensor or a portion of the inertial sensor.

2. The method of claim 1, wherein estimating the bias value includes:

storing a first bias value as the bias; and for a first rate-of-turn sample of the plurality of rate-of-turn samples, determining a second bias value, wherein the second bias value is a sum of the bias plus a difference of the bias from the first rate-of-turn sample; and updating the bias by replacing it with the second bias value.

3. The method of claim 2, wherein the second bias value is multiplied by a constant before updating, wherein the constant is associated with an exponential curve fit to a plurality of bias values.

4. The method of claim 3, wherein the constant is associated with a time interval between the first rate-of-turn sample and a previous rate-of-turn sample.

5. The method of claim 2, wherein determining the second bias value comprises determining the second bias value when the first rate-of-turn sample is less than a selected threshold value and updating the bias by replacing the first bias value with the second bias value when the first rate-of-turn sample is less than the selected threshold value.

6. The method of claim 5, wherein determining the second bias value comprises storing the second bias value in a buffer;

clearing the buffer when the first rate-of-turn sample is greater than the selected threshold value; and updating the bias with the second bias value from the buffer when the first rate-of-turn sample is less than the selected threshold value.

7. The method of claim 3, wherein the constant is associated with a counter value that is increased until it is greater than a ratio of a time constant divided by a time interval, wherein the time interval is the time between the first rate-of-turn sample and a previous rate-of-turn sample, and wherein the time constant is associated with a bias sequence, including the bias and second bias value, that includes a plurality of bias values, with each bias value of the of the plurality of bias values closer to the actual bias than the bias value determined prior to the bias value.

8. The method of claim 1, wherein the weights of the weighted average are dynamically varied to initialize the estimating by emphasizing initial samples of the plurality of rate-of-turn samples.

9. The method of claim 8, wherein the estimating includes a uniform weighting of a first set of samples preceding an exponential weighting, comprising:

computing a difference between each sample and a current bias estimate;

numbering each of the plurality of rate-of-turn samples;

for a rate-of-turn sample number n of the plurality of rate-of-turn samples, subtracting the bias from the rate-of-turn sample number n to produce a difference and dividing the difference by a lesser of n and a value that is approximately a quotient of an exponential time constant and an interval between samples to produce a scaled difference; and adding the scaled difference to the bias estimate to form a subsequent bias estimate.

10. The method of claim 8, comprising dividing each successive bias estimate by a value resulting from substituting each actual sample in the weighted average by the constant value 1.

11. The method of claim 1, wherein the weighted average includes an exponentially-weighted average.

12. The method of claim 11, wherein estimating the bias includes:

determining a difference between each of the plurality of rate-of-turn samples and the bias;

dividing each difference by a divisor less than 1 to produce a scaled difference;

adding the scaled difference to the bias to produce a subsequent bias estimate;

wherein determining the adjusted rate-of-turn sample includes: determining a subsequent adjusted rate-of-turn sample by subtracting the subsequent bias estimate from a subsequent rate-of-turn sample of the plurality of rate-of-turn samples; and wherein outputting the adjusted rate-of-turn sample includes: outputting the subsequent rate-of-turn sample.

13. The method of claim 1, further comprising:

monitoring the plurality of rate-of-turn samples, from the inertial sensor, in a sequence over time during turning of the vessel; and adjusting a rate-of-turn of the vessel based on the adjusted rate-of-turn sample.

14. A system for estimating a bias affecting an inertial sensor, the system comprising:

a sensor configured to produce a plurality of rate-of-turn samples in a sequence over time, wherein each of the plurality of rate-of-turn samples includes a substantially identical actual bias value as is included in each of the plurality of other rate-of-turn samples;

a bias estimating circuit to estimate the bias as a weighted average of the plurality of rate-of-turn samples;

an adjusted rate-of-turn determination circuit coupled to the bias value determining circuit configured to determine an adjusted rate-of-turn sample by subtracting the bias from an instant rate-of-turn sample of the plurality of rate-of-turn samples;

an output transmitter in communication with the adjusted rate-of-turn determination circuit, the output transmitter configured to output the adjusted rate-of-turn sample to electronics to calibrate rate-of-turn samples of the inertial sensor based on the adjusted rate-of-turn sample; and a display unit in communication with the electronics, the display unit configured to display visual navigation indicia associated with the adjusted rate-of-turn sample.

15. The system of claim 14, wherein the bias estimating circuit comprises a machine readable medium including instructions that, when executed by a component of a machine, cause the machine to perform operations to determine the weighted average as an exponentially-weighted average.

16. The system of claim 15, wherein the bias estimating circuit comprises a machine readable medium including instructions that, when executed by a component of a machine, cause the machine to perform operations to:

determine a difference between each of the plurality of rate-of-turn samples and the bias;

divide each difference by a divisor less than 1 to produce a scaled difference;

add the scaled difference to the bias to produce a subsequent bias estimate, and wherein the adjusted rate-of-turn determination circuit comprises a machine readable medium including instructions that, when executed by a component of a machine, cause the machine to perform operations to:

determine a subsequent adjusted rate-of-turn sample by subtracting the subsequent bias estimate from a subsequent rate-of-turn sample of the plurality of rate-of-turn samples; and wherein the output transmitter is configured to put out the subsequent rate-of-turn sample.

17. The system of claim 14, wherein the bias estimating circuit comprises a machine readable medium including instructions that, when executed by a component of a machine, cause the machine to perform operations to dynamically vary the weights of the weighted average to initialize estimation with relatively increased emphasis on initial samples of the plurality of rate-of-turn samples.

18. The system of claim 17, wherein the bias estimating circuit comprises a machine readable medium including instructions that, when executed by a component of a machine, cause the machine to perform operations to divide each successive bias estimate by a value resulting from substituting each actual sample in the weighted average by the constant value 1.

19. The system of claim 14, wherein the visual indicia indicates how much directional change of a vessel has resulted from the plurality of rate-of-turn samples.

20. A navigation system for estimating a bias affecting an inertial rate-of-turn sensor in a navigation system for a marine vessel, the navigation system comprising:

a microelectromechanical inertial sensor configured to produce a plurality of rate-of-turn samples in a sequence over time, wherein each of the plurality of rate-of-turn samples includes substantially identical actual bias value as is included in each of the plurality of other rate-of-turn samples;

a bias estimating circuit to estimate the bias as a weighted average of the plurality of rate-of-turn samples;

an adjusted rate-of-turn determination circuit coupled to the bias value determining circuit configured to determine an adjusted rate-of-turn sample by subtracting the bias from an instant rate-of-turn sample of the plurality of rate-of-turn samples to calibrate the microelectromechanical inertial sensor so the microelectromechanical inertial sensor provides a signal that accurately represents motion of the marine vessel;

a wireless transmitter in communication with the adjusted rate-of-turn determination circuit, the wireless transmitter configured to output the signal representing an adjusted rate-of-turn wirelessly;

a display unit configured to receive the signal and show an electronically controlled compass associated with the adjusted rate-of-turn that can indicate a directional change of the marine vessel; and a battery to power the system.

21. The system of claim 20, wherein the wireless transmitter is a Bluetooth transmitter.

22. The system of claim 20, wherein:

the rate-of-turn samples are produced by the microelectromechanical inertial sensor based on a control input to a steering system for the marine vessel; and the display unit shows visual indicia that indicates how much directional change of the marine vessel has resulted from the control input.

* * * * *

UNITED STATES PATENT AND TRADEMARK OFFICE

CERTIFICATE OF CORRECTION

PATENT NO. : 9,638,543 B2
APPLICATION NO. : 13/795189
DATED : May 2, 2017
INVENTOR(S) : Robert Leonard Nelson It is certified that error appears in the above-identified patent and that said Letters Patent is hereby corrected as shown below:

In the Drawings

On sheet 5 of 11, Fig. 5, reference numeral 522, Line 1, delete “BAIS” and insert --BIAS-- therefor On sheet 8 of 11, Fig. 8, reference numeral 806, Line 1, delete “BAIS” and insert --BIAS-- therefor In the Specification In Column 13, Line 57, after “electronics”, insert --.--

Signed and Sealed this
Eighth Day of May, 2018

Andrei Iancu
*Director of the United States Patent and Trademark Office*